United States Patent
Harris et al.

(10) Patent No.: US 7,125,915 B2
(45) Date of Patent: *Oct. 24, 2006

(54) LIPID-BASED NANOTUBULES FOR CONTROLLED RELEASE OF HEALING AGENTS IN GOLF BALL LAYERS

(75) Inventors: Kevin M. Harris, New Bedford, MA (US); William B. Lacy, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 114 days.

This patent is subject to a terminal disclaimer.

(21) Appl. No.: 10/933,996

(22) Filed: Sep. 3, 2004

(65) Prior Publication Data

US 2005/0038173 A1 Feb. 17, 2005

Related U.S. Application Data

(63) Continuation-in-part of application No. 10/358,923, filed on Feb. 5, 2003, now Pat. No. 6,815,472, said application No. 10/933,996 is a continuation-in-part of application No. 10/176,720, filed on Jun. 21, 2002, now Pat. No. 6,808,461.

(60) Provisional application No. 60/403,923, filed on Aug. 16, 2002, provisional application No. 60/300,124, filed on Jun. 22, 2001.

(51) Int. Cl.
*A63B 37/00* (2006.01)
*A63B 37/02* (2006.01)

(52) U.S. Cl. .................. 523/200; 523/210; 523/211; 428/402.2; 428/402.24; 473/371; 473/374; 473/377; 473/378

(58) Field of Classification Search .................. None
See application file for complete search history.

(56) References Cited

U.S. PATENT DOCUMENTS

| | | | |
|---|---|---|---|
| 3,318,697 A | 5/1967 | Shrewsbury | |
| 4,877,501 A | 10/1989 | Schnur et al. | 204/157.64 |
| 4,911,981 A | 3/1990 | Schnur et al. | 428/402.24 |
| 4,990,291 A | 2/1991 | Schoen et al. | 264/4.7 |
| 5,049,382 A | 9/1991 | Price et al. | 424/450 |
| 5,492,696 A | 2/1996 | Price et al. | 424/417 |
| 6,280,759 B1 | 8/2001 | Price et al. | 424/408 |
| 6,358,160 B1 | 3/2002 | Winskowicz | 473/378 |
| 6,808,461 B1 * | 10/2004 | Harris et al. | 473/370 |
| 6,815,472 B1 * | 11/2004 | Lacy | 523/200 |
| 2004/0034122 A1 | 2/2004 | Lacy | 523/210 |

* cited by examiner

*Primary Examiner*—David J. Buttner
(74) *Attorney, Agent, or Firm*—William B. Lacy

(57) ABSTRACT

A golf ball including a core and a layer disposed concentrically about the core; wherein at least one of the core or the layer is formed of a polymer composition including a lipid-based nanotubule-encapsulated healing agent; the healing agent being present in an amount between about 0.1% and about 20.0% of the composition by weight.

20 Claims, No Drawings

LIPID-BASED NANOTUBULES FOR CONTROLLED RELEASE OF HEALING AGENTS IN GOLF BALL LAYERS

CROSS REFERENCE TO RELATED APPLICATIONS

This application is a continuation-in-part of U.S. application Ser. No. 10/358,923, filed Feb. 5, 2003 now U.S. Pat. No. 6,815,472, which claims priority to U.S. Provisional Application No. 60/403,923, filed Aug. 16, 2002. This application is also a continuation-in-part of U.S. application Ser. No. 10/176,720, filed Jun. 21, 2002 now U.S. Pat. No. 6,808,461, which claims priority to U.S. Provisional Application No. 60/300,124, filed Jun. 22, 2001.

FIELD OF THE INVENTION

The present invention relates to golf balls and, in particular, to golf balls components formed form compositions comprising lipid-based nanotubules for controlled release of healing agents.

BACKGROUND OF THE INVENTION

Golf balls can generally be divided into two classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric material, and a cover. Solid balls have traditionally been considered not only longer and more durable than wound balls, but also lacking a particular "feel" provided by the wound construction that was preferred by accomplished golfers.

By altering solid ball construction and composition, however, manufacturers have learned how to vary a wide range of playing characteristics, such as resilience, durability, spin, and "feel," each of which can be optimized for various playing abilities. This improvement in construction technology has allowed current solid golf balls to provide feel characteristics more like their wound predecessors. The golf ball components, in particular, that many manufacturers continually look to improve are the center or core, intermediate layers, if present, and covers.

Golf ball cores and/or centers are typically constructed with polybutadiene-based polymer compositions. Compositions of this type are constantly being altered in an effort to provide a higher coefficient of restitution ("COR") while concurrently lowering compression which, in turn, can lower the golf ball spin rate, provide better "feel," or both.

Manufacturers also address the properties and construction of golf ball intermediate and cover layers. These layers have conventionally been formed of ionomers and ionomer blends of varying hardness and flexural moduli. The hardness range of ionomers is limited and even the softest blends can suffer from a "plastic" feel. Recently, however, polyurethane-based materials have been employed in golf ball layers and, in particular, outer cover layers, due to their softer "feel" characteristics, without a noticeable loss in resiliency and/or durability.

There remains a need, however, for improved golf ball center, core, layer, cover, and coating materials. Therefore, the present invention is directed to the use of novel, lipid-based nanotubules blended into the polymers or coatings/adhesives from which golf ball components are formed. The nanotubules are "loaded" (filled) with active agents, such as UV absorbers, light stabilizers, bleaching agents, dyes, fluorophores, and/or healing agents, to name a few, for the controlled release of these compounds during the life of the golf ball. It is envisioned that certain compounds may be selected that can prolong the useful life and performance of a golf ball because they are being "replenished" as a function of time.

SUMMARY OF THE INVENTION

The present invention is directed to a golf ball comprising a core; and a cover layer disposed concentrically about the core; wherein at least one of the core or the cover is formed of a polymer comprising lipid-based nanotubules in which an active compound is microencapsulated. In one embodiment, the cover includes the lipid-based nanotubules. The cover can be an outer core layer, an inner cover layer, or an outer cover layer. The core may be a single layer or include a center and an outer core layer. Either may include the lipid-based nanotubules of the present invention. In a preferred embodiment, the center and/or core composition includes an organosulfur compound. Preferably, the core has an outer diameter of between about 1.5 inches and about 1.62 inches and the cover layer preferably includes an inner cover layer and an outer cover layer, at least one of which contains the lipid-based nanotubules.

The polymer containing the nanotubules thermoplastics, thermosets, ionomers, non-ionomers, polysaccharides; polyesters; polyamides; polypeptides; polyurethanes; polyureas, polyethylenes; polypropylenes; polyvinylchlorides; polystyrenes; polyphenols; polyvinyl pyrollidones; polyvinyl alcohols; ethylcelluloses; gar gums; metallocene-catalyzed polymers; polyvinyl formal resins; water soluble epoxy resins; urea-formaldehydes; polylysines; chitosans; polyvinyl acetates; and polymers containing $\alpha,\beta$-unsaturated carboxylic acid groups, or the salts thereof.

Preferably, the acid groups have been 100% neutralized by an organic acid or a salt, a cation source, or a suitable base thereof. In a preferred embodiment, the active compound has a diameter and the nanotubules have an inner diameter between about 2 to about 1000 times the diameter of the active compound. Ideally, the nanotubule has an inner diameter between about 20 to about 500 times the diameter of the active compound. The nanotubules are preferably configured to release the active compound at a constant rate. Additionally, the nanotubules may further include a solubility modifier in an amount sufficient to alter the rate of release of the active compound. The active compound should have a sufficiently low viscosity to facilitate loading the nanotubules by capillary action. The active compound may also include UV absorbers, light stabilizers, bleaching agents, fluorophores, healing agents, catalysts, reactive identifiers, inks, dyes, and indicators.

In one embodiment, the nanotubules have an inner diameter of from about 50 nm to about 20 μm and, more preferably, from about 100 nm to about 1 μm, and most preferably, from about 200 nm to about 800 nm. In another embodiment, the nanotubules have a length of from about 1 μm to about 1 mm, more preferably, from about 10 μm to about 200 μm. The polymer that contains the nanotubules preferably includes between about 5% and about 70% nanotubules.

In another embodiment, a coating layer including the nanotubules is present. The coating may be formed from paints, primers, adhesives, urethanes, epoxies, or dyes and can be applied by roller, brush, dipping, or spray.

The cover layer is formed by compression molding, injection molding, casting, or reaction injection molding. Preferably, the cover layer is an outer cover layer and includes polyureas, polyurethanes, polyurethane-ureas, polyurea-urethanes, or epoxies. Ideally, the polyureas, polyurethanes, polyurethane-ureas, polyurea-urethanes, or epoxies are aliphatic or saturated. In an alternative embodiment, the golf ball has a coefficient of restitution of greater than about 0.8.

The present invention is also directed to a golf ball comprising a core; an intermediate layer disposed about the core; a cover disposed about the intermediate layer; and a coating layer; wherein the cover is comprised of lipid-based nanotubules comprising UV absorbers, light stabilizers, bleaching agents, fluorophores, healing agents, catalysts, reactive identifiers, inks, dyes, or indicators for controlled release into at least one of the adjacent intermediate or coating layers.

The present invention is further directed to a golf ball comprising a core; and a cover layer disposed concentrically about the core; wherein at least one of the core or the cover is formed of a polymer comprising lipid-based nanotubules.

The present invention is also directed to a golf ball comprising a core; and a layer disposed concentrically about the core; wherein at least one of the core or the layer is formed of a polymer composition comprising a lipid-based nanotubule-encapsulated healing agent present in an amount between about 0.1% and about 20.0% of the composition by weight. In one embodiment, the layer includes the lipid-based nanotubules and is an outer core layer, an inner cover layer, or an outer cover layer. In another embodiment, the core comprises a center and an outer core layer including the lipid-based nanotubules. In a preferred embodiment, the core includes a base rubber and an organosulfur compound.

The core typically has an outer diameter of between about 1.5 inches and about 1.62 inches. The composition can include an ionomer having acid groups that have been 100% neutralized by a salt of an organic acid, a cation source, or a suitable base thereof. The polymer includes thermoplastics, thermosets, ionomers and acid precursors; polyolefins; non-ionomers, polysaccharides; polyesters; polyamides; polypeptides; polyurethanes; polyureas, polyethylenes; polypropylenes; polyvinylchlorides; polystyrenes; polyphenols; polyvinyl pyrollidones; polyvinyl alcohols; ethylcelluloses; gar gums; metallocene-catalyzed polymers; polyvinyl formal resins; water soluble epoxy resins; ureaformaldehydes; polylysines; chitosans; polyvinyl acetates; polymers containing α,β-unsaturated carboxylic acid groups, or the salts thereof; polycarbonates; polyarylates; polyimides; polyphenylene oxides; polyethers; silicones; polysiloxanes; polyisoprenes; block copoly(ether or ester-amides); block copoly(ether or ester-esters); polysulfones; reaction injection moldable thermoplastic and thermoset polymers; block copolymers of styrene-butadiene; dynamically vulcanized ethylene-propylene rubbers; polyvinylidenefluorids; acrylocnitrile-butadiene styrene copolymers; epoxy resins; acrylics; or polybutadienes.

The healing agent generally includes a polycyclic organic moiety or its functionalized derivatives. Additionally, the composition further includes a catalyst. Preferably, the catalyst includes a Grubb's catalyst, a ruthenium-based catalyst, an iron-based catalyst, an osmium catalyst, a living polymerization catalyst, a transition metal catalyst, or a mixture thereof.

The nanotubule should be configured to release the healing agent at a constant rate and can further include a solubility modifier in an amount sufficient to alter the rate of release of the healing agent. The catalyst may also be encapsulated in the lipid-based nanotubules, which preferably have an inner diameter of from about 50 nm to about 1 μm, more preferably from about 200 nm to about 800 nm. The nanotubules also should have a length of from about 1 μm to about 1 mm, more preferably from about 10 μm to about 200 μm. In a preferred embodiment, the polymer composition includes between about 5% and about 70% nanotubules. Ideally, the layer is an outer cover layer and includes saturated or unsaturated polyureas, polyurethanes, polyurethane-ureas, polyurea-urethanes, or epoxies.

The present invention is also directed to a golf ball comprising a core; an intermediate layer disposed about the core; a cover disposed adjacent to the intermediate layer; and a coating layer disposed adjacent to the cover; wherein the cover is comprised of lipid-based nanotubule-encapsulated healing agent for controlled release of the healing agent into at least one of the adjacent intermediate or coating layers.

DETAILED DESCRIPTION OF THE PREFERRED EMBODIMENTS

The golf balls of the present invention may comprise any of a variety of constructions, from a simple one-piece solid ball, to a two-piece ball formed of a core and cover, to a three piece dual core single cover to any multi-piece construction, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers, at least one of which may be an adhesive or coupling layer. The layers may be continuous or non-continuous (i.e., grid-like). The core may also comprise a solid or liquid filled center around which many yards of a tensioned elastomeric material are wound.

The present invention is directed to the above-described cores, layers, and covers comprising lipid-based nanotubules. Lipid tubules are a self-organizing system in which surfactants crystallize into tightly packed bilayers that spontaneously form cylinders less than 1 μm in diameter. These novel cylindrical lipid structures, called nanotubules, can be used to entrap and release a variety of active compounds into surrounding materials. This approach to microencapsulation and controlled release has been shown to be effective for pharmaceutical drugs and for natural and man-made agents that are active in the prevention a number of undesirable properties, such as bio-fouling. This invention is directed to the controlled release of desirable active agents or compounds, microencapsulated in nanotubules, by their dispersion in golf ball coatings, paints, adhesives, and component compositions. The tubules can be dispersed wet, aqueous or solvent-based, or dry, if robustness is required.

Suitable tubules include those formed by the self organization of polymerizable lipid-based molecules. The tubules are typically formed from diacetylinic phosphatidylcholine by several different techniques, such as heating the lipid above the phase transition temperature followed by slow cooling. Alternatively, the tubules can be formed by heating the lipid above the phase transition temperature, rapidly cooling the lipid to about 0° C., raising the temperature above the phase transition temperature a second time, and slowly cooling it to room temperature. Other additional methods of forming the nanotubules of the present invention are envisioned. Naturally occurring nanotubules, such as halloycite, are also suitable for the present invention.

Alternatively, the nanotubules may additionally contain a metal (on the inner and/or outer surfaces). The tubules can be metallized with any metal (or alloy thereof) capable of being plated. Metal tubules may be prepared by plating a metal on a filament which is soluble in a hydrocarbon solvent, to form an outer layer of metal, and then removing the central filament by exposure to a hydrocarbon solvent. Alternatively, a porous membrane may be plated with a metal to form a layer of metal on the inside surface of the pores, dissolution of the membrane, and collection of the metal tubules. Once coated with metal, the tubules are filtered to remove the solvent and are air dried to a powder form. At this point the tubules can be stirred into a coating, such as a paint or adhesive, by gentle agitation. If the tubules are processed to a wet stage and then solvent exchanged with a coating compatible solvent, the tubules can be mixed directly into a coating or composition with a diluent solvent.

A critical aspect of the tubules is, of course, their dimensions. Suitable inner diameters for range from about 50 nm to about 20 µm, preferably from about 100 nm to about 1 µm, and most preferably from about 200 nm to about 800 nm. The inner diameter of the tubules and the desired time period of release may be controlled by varying the conditions used to produce the tubules. These include choice of active agent, carrier, environment surrounding the tubule, and other components of the composition (if the tubules are present in a composition). Generally, the diameter of the tubule will be 2 to 1,000 times the average diameter of the active agent or compound, preferably 20 to 500 times the average diameter. The nanotubules are not limited to those of any specific length. For any given tubule the time of effectiveness will increase with an increase in the length of the tubule. Generally, the tubules will be of a length ranging from about 1 µm to about 1 mm, more typically from about 10 µm to about 200 µm.

Because of the tight packing of the surfactants in tubules, the microstructures should dissolve from their ends only. Since the size of the end (the only available surface area for removal of active agent) is constant until the tubule is annihilated, a population of tubules of uniform length will release surfactant at a constant rate. A controlled rate of release of a compound from a coating or polymer matrix can be achieved by creating a porous structure of controlled dimensions within a coating. The compound must migrate through the coating to reach the inner or outer environment or adjacent materials. This structure can be created by adding to a coating (or polymer composition) an effective amount of between about 5% and about 70% of nanotubules that contain or are composed of the desired active agent or compound.

The tubules, which act as microvials, can be filled by a variety of techniques including capillary action. Compounds and active agents include UV absorbers, light stabilizers, bleaching agents, fluorophores, healing agents, and catalysts. Suitable UV absorbers and light stabilizers are described in U.S. application Ser. No. 09/861,909, the disclosure of which is incorporated herein, in its entirety, by express reference thereto. Suitable healing agents are described in U.S. application Ser. No. 10/176,720, the disclosure of which is incorporated herein, in its entirety, by express reference thereto.

In a preferred embodiment, the lipid-based nanotubules are filled with and encapsulate a healing agent. Any of the components of the golf balls of the present invention can be formed, either partially or fully, polymeric compositions including the nanotubule-encapsulated healing agent. Preferably the polymer compositions include at least one of a base material and a nanotubule-encapsulated healing agent. For the base material, the bulk of the golf ball material can be a thermoplastic, such as thermoplastic polyurethanes and SURLYN®-type ionomers, or a thermoset, such as thermoset polyurethanes or crosslinked polybutadiene. Microencapsulated healing agents are the "glue" that fixes the micro-cracks formed in the base material. These healing agents are typically fluids, such as dicyclopentadiene ("DCPD"). DCPD is preferably encapsulated in the lipid-based nanotubules that are spread throughout the polymeric or rubber base material. Preferably, there are at least about 100 nanotubules per cubic inch, preferably between about 100 and 200 nanotubules per cubic inch.

In order to polymerize and "heal" upon time release from the nanotubules, the healing agent must come into contact with a catalyst. A preferred catalyst, called Grubbs catalyst, is used for this self-healing material. It is important that the catalyst and healing agent remain separated until they are needed to seal a crack. When a micro-crack forms in the base material, it will spread through the material. By doing so, this crack will rupture the nanotubules and release the healing agent. This healing agent will flow down through the crack and will inevitably come into contact with the Grubbs catalyst, which initiates the polymerization process. This process will eventually bond the crack closed. In one embodiment, the nanotubules encapsulate the catalyst as well.

In a preferred embodiment, the self-healing polymer blend has a flexural modulus of from about 2,000 to about 200,000 psi and contains nanotubules filled with dicyclopentadiene, dicyclohexa (or penta or octa) diene, (a liquid tricyclic diolefin). A polymerization catalyst is dispersed throughout the cover (in one embodiment), preferably a ruthenium carbene complex. One source of the Grubbs catalyst is from Strem Chemicals, 7 Mulliken Way, Newburyport, Mass. The Grubbs ruthenium-based catalyst is very efficient at initiating various reactions including olefin metathesis with high functional group tolerance. Other potential suitable catalysts include elements such as iron, osmium, rhodium, iridium, palladium and platinum. It is believed that iron should have similar electronic behavior, which could lead to a successful iron based olefin metathesis catalyst. In addition, it is believed that the use of living (uninterrupted chain ends) polymerization catalysts is preferred, allowing multiple healing opportunities.

The rate of release of the compound as a function of area can be further controlled by the "loading" of the nanotubules, the concentration of the compound or agent contained in the tubules, the dimensions of the tubules, and solubility modifiers also contained within the nanotubules. The compound is chosen during the manufacture of the tubules, and its rate of release can be further modified during encapsulation by the addition of solubility modifiers such as glues, resins, polymers and other "slow release agents."

The hardness and ablation rate of a coating is controlled by the selection of the resins used as the coating vehicle. Vinyl-resin mixtures, acrylics, polyurethanes, and epoxies have been used successfully for this purpose. Further control of the coating properties and the release rates of the toxicants can be controlled by the orientation and distribution of the tubules by two methods. Orientation can be accomplished by coating the surface in the presence of a magnetic or electrical field which creates a preferred orientation of the tubules to the coated surface, either parallel or normal. In addition, in coatings where the film thickness is less than the average tubule length, the tubules can be oriented parallel to the surface.

Because of the aspect ratio and size of the tubules, the tubules can further act to form, within the coating, a network which adds improved physical characteristics. At the least the tubules extend down into the surface so that they are anchored in place. The ability to form a composite structure within the coating may provide enhanced structural properties not normally associated with the coating or composition within which the tubules are dispersed.

The present coatings and/or compositions (containing the nanotubules) may be applied to a surface by any conventional techniques. Thus, the coating compositions may be applied by roller, brush, or spray over a suitable primer or barrier coating, if necessary. The tubules are easily dispersed in paint and may be applied by means commonly used in the application of paint coatings. In addition, the tubules may be dried, and metal or metallized tubules can be oxidized. Such oxidized tubules can be charged and applied to oppositely charged surfaces by conventional powder coating technology. If the tubules are dispersed in a polymer blend or matrix, the composition may be further injection or compression molded, as desired. Additionally, the nanotubules may be dispersed in any of the reactants in a casting or reaction injection molding process.

A carrier is used to "fill" the tubules with the desired compound or active agent. The selection of the carrier is determined by the viscosity of the carrier and the solubility of the active agent in the carrier. The carrier must possess a sufficiently low viscosity so that it can fill the tubule as a result of capillary action.

If the agent is soluble or is mobile in the carrier, then the rate of release depends on the diffusion rate and solubility of the agent in the carrier and in the external matrix (if present). If the agent is insoluble or immobile in the carrier, then the rate of release depends on the rate of release of the carrier itself from the tubule.

In the present context, release means delivery of the agent to a surrounding matrix (e.g., in a coating composition). Accordingly, suitable carriers include low molecular weight polymers and monomers. Specific examples of such polymers include polysaccharides; polyesters; polyamides; nylons; polypeptides; polyurethanes; polyureas, polyethylenes; polypropylenes; polyvinylchlorides; polystyrenes; polyphenols; polyvinyl pyrollidone; polyvinyl alcohol; ethylcellulose; gar gum; polyvinyl formal resin; water soluble epoxy resins; urea-formaldehyde; polylysine; chitosan; polyvinyl acetate and copolymers; and mixtures thereof.

Other uses for the nanotubules may include adhesion; thin-layer enforcement or stability; custom indicia or novel cover layers (i.e., metallized tubules blended with cover material, which, upon oxidation, form colored "swirls" or patterns); reactive identifiers (i.e., age, heat, moisture, impact frequency, etc.); inks; and dyes.

Methods and processes for forming selected microstructures having predetermined shape and dimension from surfactants are described in U.S. Pat. Nos. 4,877,501 and 4,990,291; methods necessary to coat tubular, spheroidal, and helical lipid microstructures with a range of metals are described in U.S. Pat. No. 4,911,981; and tubules are useful in the production of coating compositions for the protection of surfaces coming into contact with water, adhesive resins for the production of laminated wood products, and devices for dispensing pesticides are described in U.S. Pat. No. 6,280,759, all of which are incorporated herein, in their entirety, by express reference thereto.

Suitable polyurethane-type materials for blending with the nanotubules of the present invention or by which any cover layer, preferably outer cover layers may be formed if not blended with the nanotubules include, but are not limited to, polyurethanes, polyurethane-ureas, polyurea-urethanes, polyureas, or epoxies, that generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI");p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy] ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

The nanotubules may be included in the golf ball cores or, if the nanotubules are used in other components of the golf ball, the cores may be formed of conventional materials. The cores are substantially solid and form a center of the golf ball. The cores may also contain a liquid-, gas-, or gel-filled center. The cores of the present invention are surrounded by a single-layer or multiple-layer core or cover layers and are, optionally, painted, especially when a non-aliphatic or non-saturated polyurethane cover is employed. The balls may also include intermediate layers of molded or wound material as known by those of ordinary skill in the art. The present invention is therefore not limited to incorporating the cores into any particular golf ball construction and the present cores can be used in any constructions.

The materials for solid cores include compositions having a base rubber, a crosslinking agent, a filler, a halogenated organosulfur compound, and a co-crosslinking or initiator agent. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The crosslinking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslinking agent is typically present in an amount greater than about 10 parts per hundred ("pph") parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; α,α-bis (t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50% active (i.e., 2 divided by 0.5=4).

The halogenated organosulfur compounds of the present invention include, but are not limited to those having the following general formula:

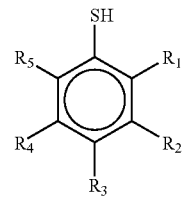

where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUK-TOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes a method to convert the cis-isomer of the polybutadiene resilient polymer component to the trans- isomer during a molding cycle and to form a golf ball. A variety of methods and materials suitable for cis-to-trans conversion have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference. Plasma treatment and coatings and adhesives, including silanes and silane coupling agents, are also envisioned to aid in adhesion of the layers of the present invention and may also be "loaded" into the nanotubules.

Any of the cover layers may also be formed from polymers containing α,β-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

A variety of conventional components can be added to the compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to form the polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover, if present, by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

The resultant golf balls typically have a COR of greater than about 0.75, preferably greater than about 0.8, and more preferably greater than about 0.81. In a preferred embodiment, the golf ball has a COR of greater than about 0.82. The golf balls also typically have an Atti compression of at least about 30, preferably from about 50 to 120, and more preferably from about 55 to 85. A golf ball core layer, i.e., either the innermost core or any enclosing core layer, typically has a hardness of at least about 5 Shore A, preferably between about 20 Shore A and 80 Shore D, more preferably between about 30 Shore A and 65 Shore D.

When golf balls are prepared according to the invention, they typically will have dimple coverage greater than about 60 percent, preferably greater than about 70 percent, and more preferably greater than about 80 percent. The flexural modulus of the cover on the golf balls, as measured by ASTM method D6272-98, Procedure B, is typically greater than about 100 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 70 Shore D, more preferably between about 25 and about 50 Shore D, and most preferably between about 40 and about 50 Shore D. In a preferred embodiment, the outer cover has a Shore D hardness of between about 45 and about 48. The inner cover layer preferably has a material hardness of less than about 70 Shore D, more preferably between about 5 and about 70 Shore D, and most preferably, between about 20 and about 65 Shore D.

The core of the present invention has an Atti compression of less than about 120, more preferably, between about 20 and about 100, and most preferably between about 40 and about 80. In an alternative, low compression embodiment, the core has an Atti compression less than about 20, more preferably less than about 10, and most preferably, 0.

The overall outer diameter ("OD") of the core is less than about 1.650 inches, preferably, no greater than 1.620 inches, more preferably between about 1.500 inches and about 1.610 inches, and most preferably between about 1.52 inches to about 1.60 inches. In one embodiment, the core OD is between about 1.5 inches and about 1.59 inches. The OD of the inner cover layer is preferably between 1.580 inches and about 1.650 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches, there is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

It is believed that golf balls made in accordance with the present invention will exhibit appreciably greater impact durability than conventional golf balls. The polymers of the present invention may also be used in sporting equipment and, in particular, golf equipment, such as golf club inserts (i.e., a putter insert), golf clubs and shafts, golf shoe components, and coatings golf equipment.

As used herein, the term "about," used in connection with one or more numbers or numerical ranges, should be understood to refer to all such numbers, including all numbers in a range.

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A golf ball comprising:
   a core; and
   a layer disposed concentrically about the core;
   wherein at least one of the core or the layer is formed of a polymer composition comprising a lipid-based nanotubule-encapsulated healing agent present in an amount between about 0.1% and about 20.0% of the composition by weight.

2. The golf ball of claim 1, wherein the layer comprises the lipid-based nanotubules and is an outer core layer, an inner cover layer, or an outer cover layer.

3. The golf ball of claim 1, wherein the core comprises a center and an outer core layer comprising the lipid-based nanotubules.

4. The golf ball of claim 3, wherein the center comprises a base rubber and an organosulfur compound.

5. The golf ball of claim 1, wherein the core has an outer diameter of between about 1.5 inches and about 1.62 inches.

6. The golf ball of claim 1, wherein the core or the polymer composition comprises an ionomer having acid groups that have been 100% neutralized by a salt of an organic acid, a cation source, or a suitable base thereof.

7. The golf ball of claim 1, wherein the polymer comprises thermoplastics, thermosets, ionomers and acid precursors; polyolefins; non-ionomers, polysaccharides; polyesters; polyamides; polypeptides; polyurethanes; polyureas, polyethylenes; polypropylenes; polyvinylchlorides; polystyrenes; polyphenols; polyvinyl pyrollidones; polyvinyl alcohols; ethylcelluloses; gar gums; metallocene-catalyzed polymers; polyvinyl formal resins; water soluble epoxy resins; urea-formaldehydes; polylysines; chitosans; polyvinyl acetates; polymers containing α,β-unsaturated carboxylic acid groups, or the salts thereof; polycarbonates; polyarylates; polyimides; polyphenylene oxides; polyethers; silicones; polysiloxanes; polyisoprenes; block copoly(ether or ester-amides); block copoly(ether or ester-esters); polysulfones; reaction injection moldable thermoplastic and thermoset polymers; block copolymers of styrene-butadiene; dynamically vulcanized ethylene-propylene rubbers; polyvinylidenefluorids; acrylocnitrile-butadiene styrene copolymers; epoxy resins; acrylics; or polybutadienes.

8. The golf ball of claim 1, wherein the healing agent comprises a polycyclic organic moiety or its functionalized derivatives.

9. The golf ball of claim 1, wherein the composition further comprises a catalyst.

10. The golf ball of claim 9, wherein the catalyst comprises a Grubb's catalyst, a ruthenium-based catalyst, an iron-based catalyst, an osmium catalyst, a living polymerization catalyst, a transition metal catalyst, or a mixture thereof.

11. The golf ball of claim 1, wherein the nanotubule is configured to release the healing agent at a constant rate.

12. The golf ball of claim 11, wherein the nanotubule further comprises a solubility modifier in an amount sufficient to alter the rate of release of the healing agent.

13. The golf ball of claim 1, wherein the composition further comprises a lipid-based nanotubule-encapsulated catalyst.

14. The golf ball of claim 1, wherein the nanotubules have an inner diameter of from about 50 nm to about 1 μm.

15. The golf ball of claim 14, wherein the nanotubules have an inner diameter of from about 200 nm to about 800 nm.

16. The golf ball of claim 1, wherein the nanotubules have a length of from about 1 μm to about 1 mm.

17. The golf ball of claim 16, wherein the nanotubules have a length of from about 10 μm to about 200 μm.

18. The golf ball of claim 1, wherein the polymer composition comprises between about 5% and about 70% nanotubules.

19. The golf ball of claim 1, wherein the layer is an outer cover layer and comprises saturated or unsaturated polyureas, polyurethanes, polyurethane-ureas, polyurea-urethanes, or epoxies.

20. A golf ball comprising:
    a core;
    an intermediate layer disposed about the core;
    a cover disposed adjacent to the intermediate layer; and
    a coating layer disposed adjacent to the cover;
    wherein the cover is comprised of lipid-based nanotubule-encapsulated healing agent for controlled release of the healing agent into at least one of the adjacent intermediate or coating layers.

* * * * *